Feb. 14, 1967     T. S. WYATT     3,303,569
MASON'S LEVEL AND SQUARE
Filed Dec. 27, 1965
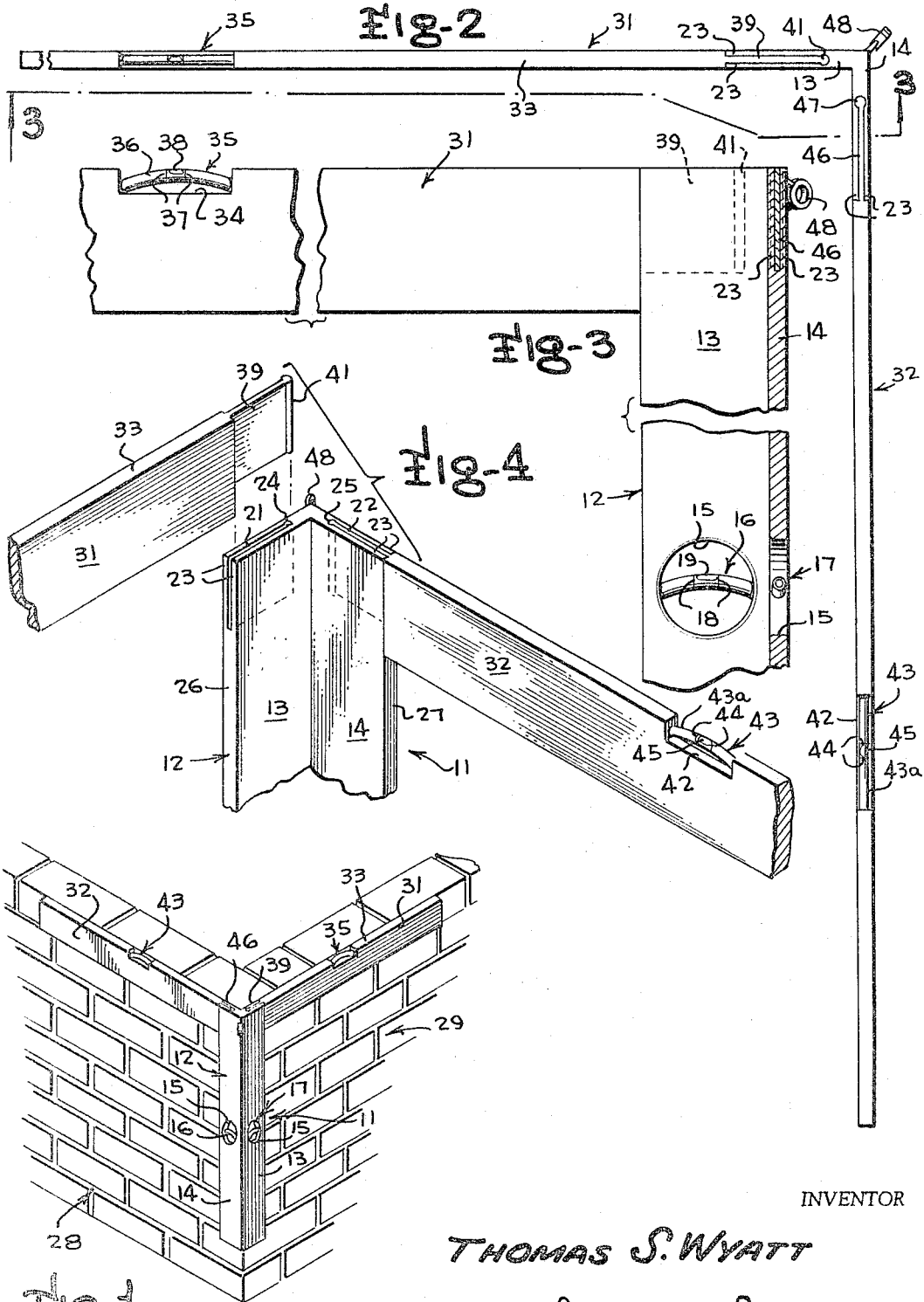
INVENTOR
THOMAS S. WYATT
BY Mason, Fenwick & Lawrence
ATTORNEY

United States Patent Office 3,303,569
Patented Feb. 14, 1967

3,303,569
MASON'S LEVEL AND SQUARE
Thomas S. Wyatt, 2111 Dresden Road,
Richmond, Va. 23229
Filed Dec. 27, 1965, Ser. No. 516,317
4 Claims. (Cl. 33—89)

This invention relates in general to hand tools, and especially to tools of the type generally known as a level or plumb, and more particularly the invention relates to a tool which might be characterized as a combination level, plumb and square.

In the construction of buildings, walls are generally designed to be vertical and openings in these walls such as for doors, windows, etc. are likewise intended to be vertical. Thus, there are two perpendicular surfaces that are intended to be vertical, one surface being that of the wall itself and the other surface being that of the end of the wall, the edge of the opening or the juncture point where the walls form a corner. Two separate measurements or checks must be thus made to determine the accuracy of the work and this can be a time consuming process. The customary carpenter's level, intended originally to indicate whether a surface was horizontal or not, is usually provided with a horizontal spirit level and one or more additional spirit levels perpendicular to the long direction of the horizontal level so that the verticality of the surfaces may be determined. When used in its vertical position the device is generally referred to as a plumb and it is common knowledge that the conventional carpenter's level is frequently used as a plumb and as a level.

In the construction of buildings, wherein the walls are built up from individual building elements such as bricks and concrete products, it is important that the elements be laid so that they are horizontal and that the surfaces of the wall be vertical. In order to accomplish this a mason must take frequent readings with both a plumb and a level to insure that the individual building elements meet the above mentioned requirements. Not only must the squareness and verticality of the wall be indicated and maintained during the construction, but it is equally as important to make sure that all corners be absolutely square. Therefore, it appears obvious that an instrument which would simultaneously indicate the condition of the walls or wall with respect to level, plumb and square would be most helpful in the building trade.

It is, therefore, an object of the invention to provide an instrument adapted to be used by members of the building trades, and especially masons, to indicate the conditions of walls with respect to level, plumb and square.

Another object of this invention is to provide a hand tool that can be used to determine the accuracy of the vertical positioning of walls that meet to form either an exterior or interior angle.

Another object of this invention is to provide a hand tool which is so constructed that it may be easily dismantled wherein the component parts may be used independently of one another as various types of levels.

It is still another object of this invention to provide a hand tool of the type described having simple and rugged construction that can withstand the rough treatment to which such tools are customarily subjected while still being simply manufactured at low cost.

Other objects, advantages and capabilities of the invention will become apparent from the following description, taken in conjunction with the accompanying drawings showing only a preferred embodiment of the invention.

In the drawings:
FIGURE 1 shows a partially completed masonry wall in perspective view indicating the manner in which the hand tool of the present invention is to be used;
FIGURE 2 is a top plan view of the hand tool of the present invention;
FIGURE 3 is a horizontal section view taken along lines 3—3 of FIGURE 2; and
FIGURE 4 is an exploded perspective view, partially broken away, showing the manner in which the component parts of the present invention interfit.

Referring to the drawings wherein like reference characters designate corresponding parts throughout the several figures, the combination level, plumb and square hand tool is indicated by the numeral 11. This invention may preferably be constructed of aluminum, but other materials that offer strong, lightweight construction may be equally utilized. The hand tool 11 generally comprises a vertical depending level bar 12 generally having perpendicularly disposed vertical level arms 13, 14. The dihedral included angle of the planes through the vertical level arms 13, 14 is necessarily a right angle so that the arms may be positioned adjacent vertical walls at the juncture point of the vertical walls so that both the square and the verticality of the walls may easily be determined.

Near the midpoint of the depending level bar 12, and in each of the vertical level arms 13 and 14, is a spirit level receiving aperture 15 which is designed to receive a tubular type of spirit level 16 in arm 13 and a similar spirit level 17 in level arm 14. The spirit levels 16 and 17 are so positioned that when the bearing surfaces of the vertical level arms 13 and 14 are vertical, the bubble in the spirit level is centered in accordance with conventional practice. Tubular spirit levels are well known and usually include a pair of spaced indicia lines 18 between which a bubble 19 is centered when the spirit level is in a horizontal position corresponding to a true vertical position of the depending level bar 12. Of course, it should be noted that the spirit levels 16 and 17 may be positioned anywhere along the length of the depending level bar. However, it is known that a center position is accurate and easily utilized.

At the uppermost portion of each of the vertical level arms 13, 14 there is an interlock slot 21, 22 respectively. These slots are formed a desired distance along the length of the arms and are defined by spaced parallel slot defining walls 23 which actually form the interlock slot 21 or 22, whichever is the case. The slots 21 and 22 each terminate within the confines of the vertical level arms in a rounded portion 24 or 25, respectively, so that an interlocking means is formed. Therefore, the interlock slots 21, 22 extend from the free vertical surfaces 26, 27, respectively, to the rounded portion where the slots terminate before they reach the juncture of the vertical level arms.

In order that masonry walls such as are indicated by numerals 28, 29 in FIGURE 1 may be checked for squareness and horizontal level, this invention contemplates the use of detachable horizontal level arms 31, 32 removably attached to the vertical level arms 13, 14 respectively. The horizontal level arms are generally identical in construction and may be used interchangeably in either of the vertical level arms. The construction of level arm 31 is generally of a rectangular shaped elongated member having a top edge 33 which is suitably notched, as indicated by numeral 34, so as to provide a recess to receive the horizontal spirit level 35. This horizontal spirit level is similar to the vertical spirit levels in that a normally glass tube 36 is filled with a suitable liquid and has near its midpoint spaced indicia marks 37 between which a bubble 39 will be positioned to show the desired degree of levelness for the masonry walls.

At the point where horizontal level arm 31 attaches to either of the vertical level arms there is provided, extending along the longitudinal centerline of the horizontal level arm, an interlock arm 39 whose free end terminates in a rounded enlargement 41 so that the interlock arm and rounded enlargement may be placed in either of the interlock slots 21 or 22. If, as is shown in the drawings, level arm 31 is placed in interlock slot 21 the interlock arm 39 would be positioned between the spaced parallel slot defining walls 23 until it is firmly fitted at the bottom of the interlock slot. This would also position the rounded enlargement 41 within the rounded portion 24 of the interlock slot thereby preventing movement of the horizontal level arm with respect to the vertical level arm in a direction corresponding with the longitudinal length of the horizontal level arm. Since the horizontal level arms 31, 32 are designed to extend outwardly from the free vertical surfaces 26, 27 respectively, it is apparent that the horizontal arms form extensions which are, in effect, perpendicularly disposed to one another and will further check the squareness in a corner of the wall in addition to the level of the wall.

Horizontal level arm 32 is identical to the one just discussed in that it comprises an elongated rectangular shaped member having a notched recess 42 to receive a tubular horizontal spirit level 43 having a glass tube 43a with, near its midpoint, spaced indicia 44 between which is centered the bubble 45. The end of the horizontal level arm 32 which engages either of the vertical level arms includes interlock arm 46 having at its free end the rounded enlargement 47. Therefore, it can be seen that horizontal level arm 32 interfits with the vertical level arms in the same manner as described for horizontal level arm 31.

At the apex of the juncture of the vertical level arms 13, 14 and near the uppermost portion thereof, there is provided a hook-eye 48 by which the hand tool 11 may be hung when it is not in use.

To check the verticality of intersecting surfaces such as masonry walls 28, 29, which intersect to form an exterior angle, the mason will preferably place the hand tool 11 at the corner of the intersecting walls in a manner shown in FIGURE 1. Generally, it is desirable to move the tool 11 up and down a slight amount to dislodge any particles that may be caught between the masonry walls and the interior flat surfaces of the vertical level arms and the horizontal level arms, and also to insure that firm contact is made. By checking the spirit levels 16, 17 the verticality of the surfaces can be determined. At this point, the squareness of the intersecting walls may be also checked by the mason in that he only needs to glance at the internal surfaces of the horizontal level arms to determine if the interior surfaces of each horizontal level arm 31, 32 is placed flat against the masonry walls along the entire length of each arm. At the same time, the level of the corners of the laid building units may be checked by concurrently noticing whether the upper surfaces of the last course of building units lie in the same plane as the uppermost flat surfaces of the horizontal level arms and also by looking at horizontal spirit levels 35, 43 to tell whether the bubbles are centered.

If the mason, or any other workman, desires to use the hand tool 11 only as a level, it is merely necessary to disengage one of the horizontal level arms which, in effect, becomes a common carpenter's level. Therefore, starting with a complete hand tool 11 as shown by the drawings, it is seen that the parts may be disengaged to provide two horizontal levels and one separate vertical level. As all three component parts of the invention may be separately used, the invention has great utility since it provides three separate tools which, when recombined, provides a tool having the ability to make three separate measurements at one time, which measurements are invaluable to a mason.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A hand tool of separable component parts for effecting measurements of planar surfaces, comprising a pair of elongated horizontal arms, an elongated vertical member detachably interlocked with and maintaining the horizontal arms in operable relation, the vertical member depending from the horizontal arms and including first and second vertical arms fixedly joined to each other in a perpendicular manner along the longitudinal length of the vertical arms to define an included angle of 90°, the vertical arms each having a free vertical surface and at least one free end surface, an elongated aperture opening on each free vertical surface and said free end surface and extending toward the juncture of the first and second vertical arms to define an interlock slot bounded by spaced parallel walls, each horizontal arm having a free end and an interlocking end, the interlocking end having an interlocking arm extending along the longitudinal axis of the horizontal arm, the interlocking arm having an interlocking means thereon and adapted to be received within the interlock slot, indicating means integral with each vertical arm and at least one horizontal arm for determining the relative spatial relationship of the planar surfaces with at least one known plane.

2. A hand tool as set forth in claim 1 wherein the interlocking means comprises an enlargement adapted to effect locking of each horizontal arm within the respective interlock slot, the interlock slot having an enlarged portion to receive the enlargement in locking relation.

3. A hand tool as set forth in claim 2 wherein extended planes of the horizontal arms intersect to form a dihedral included angle of substantially 90° between the normals of the planes.

4. A hand tool as set forth in claim 3 wherein the indicating means include spirit level means.

References Cited by the Examiner

UNITED STATES PATENTS

| | | | |
|---|---|---|---|
| 715,946 | 12/1902 | Bennett | 33—89 X |
| 1,182,730 | 5/1916 | Anderson et al. | 33—89 X |
| 1,215,848 | 2/1917 | Perkins | 33—114 |
| 1,501,814 | 7/1924 | Schofield | 33—85 |
| 1,552,371 | 9/1925 | Williams | 33—88 X |
| 2,833,043 | 5/1958 | Patejdl | 33—85 |

FOREIGN PATENTS

| | | |
|---|---|---|
| 460,296 | 5/1928 | Germany. |
| 12,070 | 1912 | Great Britain. |

LEONARD FORMAN, Primary Examiner.

H. N. HAROIAN, Assistant Examiner.